J. L. LA DRIERE.
EXTERNAL ARMOR FOR PNEUMATIC TIRES.
APPLICATION FILED JAN. 21, 1910.
958,748.
Patented May 24, 1910.
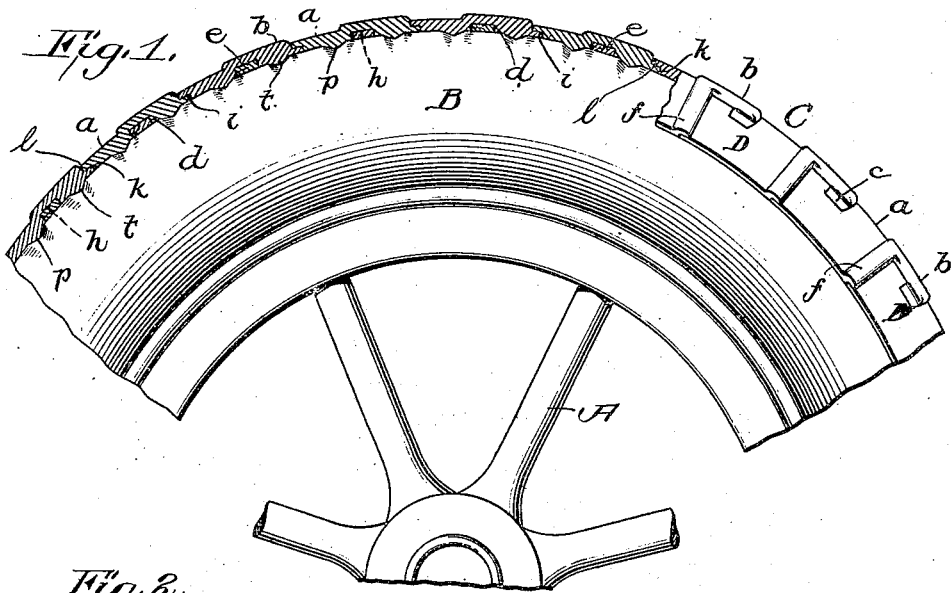
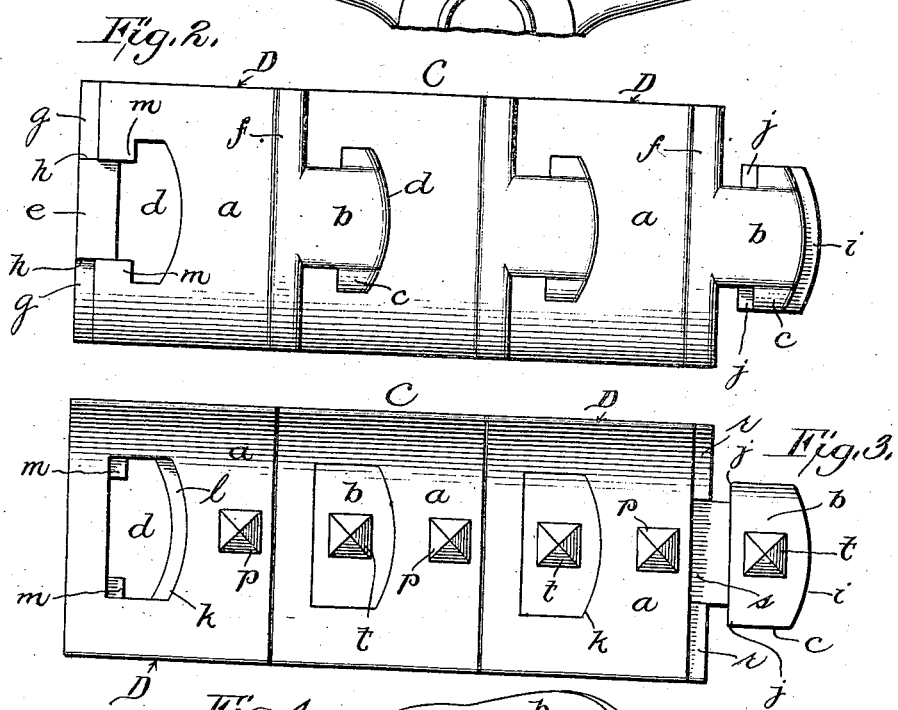
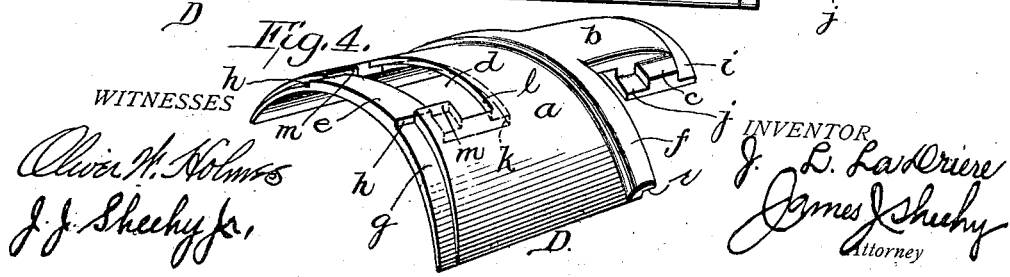

UNITED STATES PATENT OFFICE.

JOSEPH L. LA DRIERE, OF ALBUQUERQUE, TERRITORY OF NEW MEXICO.

EXTERNAL ARMOR FOR PNEUMATIC TIRES.

958,748.  Specification of Letters Patent.  Patented May 24, 1910.

Application filed January 21, 1910. Serial No. 539,359.

*To all whom it may concern:*

Be it known that I, JOSEPH L. LA DRIERE, citizen of the United States, residing at Albuquerque, in the county of Bernalillo and Territory of New Mexico, have invented new and useful Improvements in External Armors for Pneumatic Tires, of which the following is a specification.

My invention pertains to external armor for pneumatic tires; and it has for its object to provide an armor in the form of an endless chain, made up of a plurality of connected links, and adapted to be placed laterally on a tire when the same is deflated, and also adapted when the tire is inflated to retain itself in position thereon.

The invention will be best understood by reference to the following description when taken in connection with the accompanying illustration of one specific embodiment thereof, while its scope will be more particularly pointed out in the appended claims.

In the drawings constituting part hereof: Figure 1 is a view, partly in side elevation and partly in longitudinal section, illustrating my novel armor as properly positioned on the pneumatic tire of a wheel. Fig. 2 is an enlarged plan view showing a portion of the armor. Fig. 3 is a view showing the inner side thereof. Fig. 4 is a perspective view of one of the links comprised in the endless chain or ring of armor.

Similar letters designate corresponding parts in all of the views of the drawings, referring to which—

A is a portion of a wheel.

B is a portion of a conventional pneumatic tire carried by the wheel, and C is a portion of a chain or armor ring constructed in accordance with my invention.

When placed on the tire B the chain or ring C is endless and is similar in construction throughout. The chain or ring C is made up of a plurality of links D which are preferably, though not necessarily, of metal suitable to the purpose, and inasmuch as the said links are identical in construction a detailed description of the one shown in Fig. 4 will suffice to impart a definite understanding of all. The said link D, Fig. 4, comprises a body $a$ that is concavo-convex in cross-section and is slightly curved in the direction of its length, a longitudinal central tongue $b$ that is integral with the body $a$ and extends forwardly therefrom, and a T-head $c$ carried by the said tongue. In the rear portion of the body $a$ is formed an opening $d$, of general T-shape, as best shown at the left of Fig. 2, and in the outer side of the rear portion of the body is also formed a shallow recess $e$ which communicates with the rear reduced portion of the opening $d$. At its forward end the body $a$ is provided with a rib $f$, arranged exteriorly of the body and extending throughout the width thereof, and at its rear end said body is provided with exterior rabbets $g$ which are disposed at opposite sides of the bottom wall $h$ of the before-mentioned recess $e$. The tongue $b$ and the T-head $c$ thereon are provided with a flange $i$ which extends forward of the T-head $c$ throughout the length thereof and also extends in rear of the T-head, as indicated by $j$. Interiorly the body $a$ is provided with a comparatively large opening $k$ in communication with the opening $d$ and having top walls $l$ and $m$. It will also be observed by reference to Fig. 3 that the body $a$ is provided, in advance of the opening $k$, with a short protuberance $p$. In advance of the protuberance $p$, and as shown at the right of Fig. 3, the body $a$ is provided with interior rabbets $r$ which are arranged at opposite sides of the inner side of the tongue $b$ so as to afford a recess $s$ between them. On its inner side the head $c$ is provided with a protuberance $t$ similar in form to the protuberance $p$ before described.

In assembling the links D in order to form the ring or endless chain of armor, the head $c$ at one end of each link is passed through the large portion of the opening $d$ of the next forward link from the outside inward in a diagonal position, relative to said large portion, and then the opposite end of the first-named link is swung inward until the inner side of said link is flush with the inner side of the second named link. With this done, it will be seen that the flanges $i$ and $j$ on the head $c$ of the first named link will lie against the walls $l$ and $m$ of the second named link, and the exterior rabbets $g$ of the second named link will be opposed to the interior rabbets $r$ of the first named link, while the inner side of the tongue $b$ of the first named link will rest in the recess $e$ of the second named link. By virtue of this it will be observed that the links will be securely, though detachably, connected, and this in such manner that the ribs $f$ will afford transverse projections for engaging the ground and increasing the traction capacity of the armor while the tongues *b* will afford longitudinal exterior projections, calculated by engaging the ground, to prevent lateral movement or skidding of the armor thereover.

When it is desired to apply the endless chain or ring of armor embodying my invention to a tire, the tire is first deflated, and then the ring of armor is moved laterally to the position at the opposite side of the tire, with reference to the wheel rim. The tire is then inflated to the extent desired when, as will be readily understood, the links of the armor ring will, by reason of their transverse curvature, securely retain the ring on the tire and against casual displacement. It will also be understood that with the armor ring positioned as stated on the tire, the protuberances *p* and *t* of each link will sink into the tire after the manner shown in Fig. 1, and by so doing will preclude creeping of the armor ring around the tire.

It will further be understood from the foregoing that my novel armor ring will protect the tire against wear and will prevent puncture thereof, and that when necessity demands, the armor ring may be removed, after the tire is deflated, and then any one of the links D that it is desired to remove, may be readily taken out of the ring and as readily replaced by a new link.

While I have shown and described one form of my invention, it is to be understood that I am not limited to the details or the form or relative arrangement of parts disclosed, but that extensive modifications may be made therein, without departing from the spirit thereof.

Having described my invention, what I claim and desire to secure by Letters-Patent, is:

1. An external armor for pneumatic tires, comprising a plurality of links detachably joined in an endless chain or ring; each link being of concavo-convex form in cross-section, and having at one end a tongue, affording a longitudinal exterior projection, and a flanged T-head on said tongue, and also having an exterior transverse rib at the inner end of the tongue, and a recess at the inner side of the tongue, and interior rabbets at the inner side of said transverse rib and at opposite sides of said recess, and further having a T-shaped opening in its outer side near its opposite end, an exterior recess extending between said opening and end, exterior rabbets at opposite sides of said recess, and a comparatively large opening in its inner side and in communication with said T-shaped opening, for the purpose set forth.

2. An external armor for pneumatic tires, comprising a plurality of links detachably joined in an endless chain or ring; each link being of concavo-convex form in cross-section, and having at one end a tongue, affording a longitudinal exterior projection, and a flanged T-head on said tongue, and also having an exterior transverse rib at the inner end of the tongue, and a recess at the inner side of the tongue, and interior rabbets at the inner side of said transverse rib and at opposite sides of said recess, and further having a T-shaped opening in its outer side near its opposite end, an exterior recess extending between said opening and end, exterior rabbets at opposite sides of said recess, a comparatively large opening in its inner side and in communication with said T-shaped opening, an interior protuberance on the inner side of the T-head, and an interior protuberance on the link, between the tongue and the inner opening thereof.

3. An external armor for pneumatic tires, comprising a plurality of links detachably joined in an endless chain or ring and each having a tongue at one end forming a longitudinal projection, and a flanged T-head on said tongue, and a transverse rib at the inner end of the tongue, and also having a T-shaped opening in its outer side near its opposite end, a comparatively large opening in its inner side and in communication with said T-shaped opening, and the said end exteriorly rabbeted.

4. An external armor for pneumatic tires, comprising a plurality of links detachably joined in an endless chain or ring and each having a tongue at one end and a flanged T-head on said tongue and also having a T-shaped opening in its outer side, near its opposite end, and a comparatively large opening in its inner side and in communication with said T-shaped opening.

In testimony whereof I have hereunto set my hand in presence of two subscribing witnesses.

JOSEPH L. LA DRIERE.

Witnesses:
GEORGE R. CRAIG,
FRANK H. MOORE.